United States Patent  
Cho et al.

(10) Patent No.: US 12,090,654 B2
(45) Date of Patent: Sep. 17, 2024

(54) ROTATABLE ELECTRONIC DEVICE COMPRISING SENSOR

(71) Applicant: Samsung Electronics Co., Ltd., Suwon-si (KR)

(72) Inventors: Byunghun Cho, Suwon-si (KR); Woochul Lee, Suwon-si (KR); Eunsu Jeong, Suwon-si (KR); Jaewoong Choi, Suwon-si (KR); Byounguk Yoon, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 17/431,029

(22) PCT Filed: Feb. 14, 2020

(86) PCT No.: PCT/KR2020/002156
§ 371 (c)(1),
(2) Date: Aug. 13, 2021

(87) PCT Pub. No.: WO2020/171489
PCT Pub. Date: Aug. 27, 2020

(65) Prior Publication Data
US 2022/0118604 A1     Apr. 21, 2022

(30) Foreign Application Priority Data
Feb. 19, 2019   (KR) .................. 10-2019-0019350

(51) Int. Cl.
*B25J 9/00*     (2006.01)
*B25J 5/00*     (2006.01)
(Continued)

(52) U.S. Cl.
CPC ............. *B25J 9/0009* (2013.01); *B25J 5/007* (2013.01); *B25J 9/126* (2013.01); *B25J 13/089* (2013.01)

(58) Field of Classification Search
CPC . B25J 9/0009; B25J 5/007; B25J 9/126; B25J 13/089; B25J 5/00; B25J 11/00; B25J 9/161; B25J 19/02
See application file for complete search history.

(56) References Cited

U.S. PATENT DOCUMENTS 2,267,254 A      12/1941  Reilley
10,768,726 B2     9/2020  Lin et al.
(Continued)

FOREIGN PATENT DOCUMENTS

CN        1701929 A       11/2005
CN     207807743 U   *    9/2018    .............. B25J 19/00
(Continued)

OTHER PUBLICATIONS

European Search Report dated Mar. 21, 2022, issued in European Application No. 20759702.2.

*Primary Examiner* — Anne Marie Antonucci
*Assistant Examiner* — Kirsten Jade M Santos
(74) *Attorney, Agent, or Firm* — Jefferson IP Law, LLP

(57) ABSTRACT

An electronic device is provided. The electronic device includes a first device comprising a spherical housing which rotates and in which a spherical inner space is formed, and a second device which is disposed on the outer surface of the spherical housing and has a ring shape, wherein the first device comprises a first driving device which is disposed within the spherical housing and is capable of transmitting driving force to the spherical housing, a structure disposed within the spherical housing and formed such that the second device is disposed on the surface of the spherical housing, a second driving device which is disposed within (Continued)

the spherical housing and drives the structure, and at least one first sensor which is disposed in the structure and faces the inner surface of the spherical housing.

13 Claims, 7 Drawing Sheets

(51) Int. Cl.
*B25J 9/12* (2006.01)
*B25J 13/08* (2006.01)

(56) References Cited

U.S. PATENT DOCUMENTS

| | | |
|---|---|---|
| 2012/0316701 A1 | 12/2012 | Thielman |
| 2018/0043952 A1 | 2/2018 | Ellerman et al. |
| 2018/0056518 A1 | 3/2018 | Ogawa et al. |
| 2019/0152066 A1 | 5/2019 | Park et al. |
| 2019/0283823 A1 | 9/2019 | Jeong et al. |

FOREIGN PATENT DOCUMENTS

| | | | | |
|---|---|---|---|---|
| EP | 3 281 681 A1 | | 2/2018 | |
| JP | 2004-148439 A | | 5/2004 | |
| JP | 2017-196691 A | | 11/2017 | |
| KR | 10-2017-0115817 A | | 10/2017 | |
| KR | 20170115817 A | * | 10/2017 | .............. B25J 11/00 |
| KR | 20170170082 A | * | 12/2017 | ........... G03B 15/006 |
| KR | 10-1816443 B1 | | 1/2018 | |
| KR | 10-2018-0013410 A | | 2/2018 | |
| TW | 201220808 A | * | 5/2012 | |
| WO | WO-2011025463 A1 | * | 3/2011 | ................ B25J 5/00 |

* cited by examiner

ROTATABLE ELECTRONIC DEVICE COMPRISING SENSOR

CROSS-REFERENCE TO RELATED APPLICATION(S)

This application is a U.S. National Stage application under 35 U.S.C. § 371 of an International application number PCT/KR2020/002156, filed on Feb. 14, 2020, which is based on and claims priority of a Korean patent application number 10-2019-0019350, filed on Feb. 19, 2019, in the Korean Intellectual Property Office, the disclosure of which is incorporated by reference herein in its entirety.

BACKGROUND

1. Field

The disclosure relates to a rotatable electronic device including a sensor. More particularly, the disclosure relates to an electronic device including a spherical housing and an inner driving device disposed in the spherical housing.

2. Description of Related Art

An electronic device may execute various operations according to commands received from a user. The electronic device may include, for example, a sensor capable of receiving user inputs.

The above information is presented as background information only to assist with an understanding of the disclosure. No determination has been made, and no assertion is made, as to whether any of the above might be applicable as prior art with regard to the disclosure.

SUMMARY

An electronic device may include a spherical housing and an inner driving device disposed in the spherical housing. The spherical housing may be rotated by the inner driving device, and the electronic device may be moved thereby. A sensor for receiving touch inputs may be disposed on the spherical housing. However, due to rolling movements of the spherical housing when the electronic device moves, the sensor may be placed in a position in which the user has difficulty in touching the same.

Aspects of the disclosure are to address at least the above-mentioned problems and/or disadvantages and to provide at least the advantages described below. Accordingly, an aspect of the disclosure is to provide an electronic device including a sensor, wherein the sensor is maintained in a position in which the user can easily touch the same.

Additional aspects will be set forth in part in the description which follows and, in part, will be apparent from the description, or may be learned by practice of the presented embodiments.

In accordance with an embodiment of the disclosure, an electronic device is provided. The electronic device includes a first device including a spherical housing which is rotatable and has an inner space formed therein, and a ring-shaped second device disposed on an outer surface of the spherical housing, wherein the first device includes a first driving device disposed inside the spherical housing and capable of transmitting power to the spherical housing, a structure disposed inside the spherical housing and configured to allow the second device to be disposed on a surface of the spherical housing, a second driving device disposed inside the spherical housing and configured to drive the structure, and at least one first sensor disposed on the structure so as to face the inner side surface of the spherical housing.

According to various embodiments of the disclosure, a sensor is maintained in a position in which the user can easily touch the same, thereby improving usability regarding user inputs through the sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
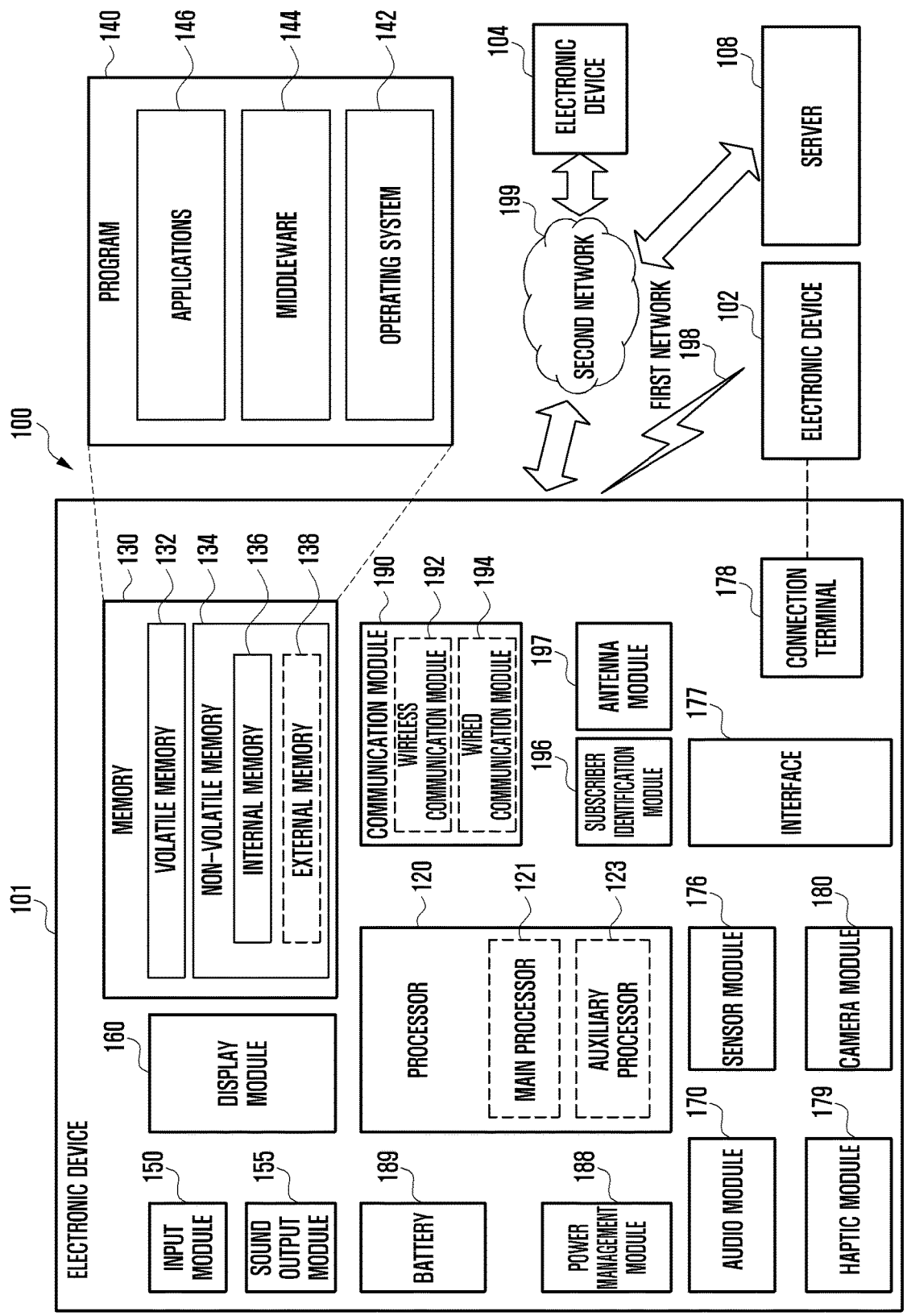
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the external electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
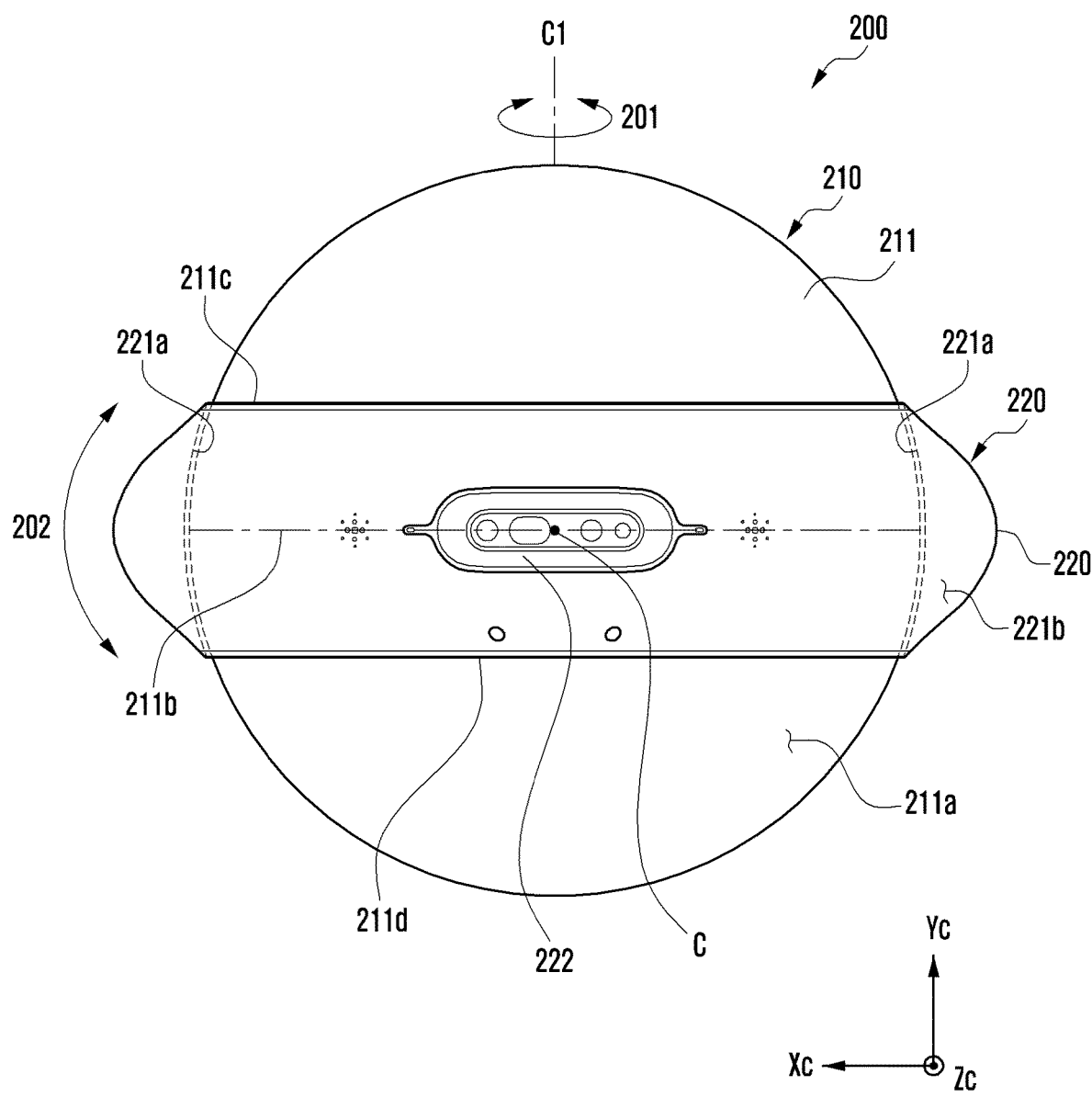
FIG. 2 is a front view of an electronic device according to an embodiment of the disclosure.

FIG. 2 is perspective view of an electronic device according to an embodiment of the disclosure.

Referring to FIG. 2, an electronic device 200 (e.g., the electronic device 101 of FIG. 1) may include a first device (or a first electronic device) 210 and a second device (or a second electronic device) 220. The first device 210 may have a spherical exterior and may cause a rolling motion of the spherical exterior to move the electronic device 200. According to an embodiment of the disclosure, the first device 210 may be referred to as a spherical moving device. The second device 220 may be disposed on the surface of the first device 210 and may move on the first device 210 under the control of the electronic device 200.

According to one embodiment of the disclosure, the first device 210 may include a spherical first housing 211, and a driving device (or an internal driving device) disposed in the first housing 211. The driving device may be a device for moving a device or a power device and thus may include a first driving device (not shown) for transmitting power (or output torque) to the first housing 211. The first housing 211 may rotate by the first driving device, and the first device 210 may move by rotation of the first housing 211. The first housing 211 may be connected to the first driving device in various manners. Hereinafter, the first housing 211 may also be referred to as a "spherical housing".

According to one embodiment of the disclosure, the first device 210 may move by using movement of the center of gravity (e.g., barycenter offset (BCO)). Movement of the center of gravity may refer to an operation of moving the center of gravity of the first device 210 in order to produce a required motion in the first device 210. For example, assuming that the first device 210 is in an equilibrium state, when the first driving device disposed in the first housing 211 moves along the inner surface of the first housing 211, a mass distribution of the first device 210 moves and the first device 210 may roll in search of a new equilibrium position.

The first device 210 of the electronic device 200 according to one embodiment may roll about the Xc-axis while being placed on the floor, to move in the Zc direction. This may be defined as a forward movement. The first device 210 may yaw around the Yc-rotational axis. When the first device 210 yaws in a stationary state, the same may make a movement similar to that of a person shaking his/her head. Alternatively, the first device 210 may change the movement direction when yawing and rolling at the same time.

According to one embodiment of the disclosure, the first device 210 may include at least one wheel (not shown) connected to the first drive device and in contact with an inner surface (or inner wall) (e.g., inner spherical surface) of the first housing 211. Power (or motion) may be transmitted from the wheel to the first housing 211 by friction of a contact surface between the wheel and the first housing 211. For example, when the first driving device rotates the wheel, power is transmitted from the wheel to the first housing 211 to rotate the first housing 211. According to one embodiment of the disclosure, the first device 210 may include a control circuit (or control device) (e.g., the processor 120 of FIG. 1) included in the first driving device or electrically connected to the first driving device. The control circuit may control the first driving device, and accordingly, the rotation direction, rotation angle, rotation amount, rotation speed, rotation acceleration, or rotation angular velocity related to the rotation of at least one wheel may be adjusted so that the movement (or motion) of the first device 210 movement may be controlled. In addition, the first device 210 may be implemented in various other mechanisms capable of causing a motion (e.g., rolling motion, rotation motion, or support motion) of the first housing 211. According to one embodiment of the disclosure, the first driving device may be controlled such that the first housing 211 rolls or rotates to move a position thereof. According to various embodiments of the disclosure, the first driving device may be controlled such that the first housing 211 rotates in place. According to various embodiments of the disclosure, the first driving device may be controlled for a support motion which prevents the first housing 211 from moving. For example, the first driving device may control a wheel such that the first housing 211 does not move due to an external force, thereby supporting the support motion of the first housing 211. As another example, the first driving device may control a wheel such that the first housing 211 does not roll down on an inclined surface, thereby supporting the support motion of the first housing 211.

According to one embodiment of the disclosure, the first device 210 may control the first driving device, based on a program (e.g., the program 140 of FIG. 1) or instructions stored in a memory (e.g., the memory 130 of FIG. 1) included in the first device 210 or the second device 220. For example, the first device 210 may control the first driving device, based on a signal (or input) received from an external electronic device (e.g., the external electronic device 102 or 104 or the server 108 of FIG. 1) or data (or values) obtained from at least one second sensor (e.g., sensor related to acceleration, gyro, or geomagnetism) disposed in at least one of the first device 210 or the second device 220, and accordingly, the rotation direction, rotation angle, rotation amount, rotation speed, rotation acceleration, or rotation angular velocity related to the rotation of at least one wheel may be adjusted.

According to one embodiment of the disclosure, the second device 220 may have a ring shape which can be disposed around a spherical surface (or first surface) 211a of the first housing 211. For example, the second device 220 may include a second housing 221 having an inner circumferential surface (or second surface) 221a that faces the spherical surface 211a of the first housing 211 so as not to be exposed to the outside, and an outer circumferential surface (or a third surface) 221b that forms a part of the exterior of the electronic device 200. According to one embodiment of the disclosure, the inner circumferential surface 221a may be disposed along a great circle 211b (e.g., a circumference formed by the intersection of the spherical surface 211a and a plane passing through the center C of the sphere) of the first housing 211. The inner circumferential surface 221a may include a curved surface covering between a first small circle 211c (e.g., a circumference formed by the intersection of the spherical surface 211a and a plane that does not pass through the center (C) of the sphere) of the first housing 211, which is parallel with and is spaced apart from the great circle 211b in the first direction (Yc) and a second small circle 211d of the first housing 211, which is parallel with and is spaced apart from the great circle 211b in the second direction (−Yc) opposite to the first direction (Yc). According to one embodiment of the disclosure, the second device 220 may include various electronic components (e.g., a camera 222, a display, a microphone, a speaker, a sensor, or battery) that are at least partially disposed in a space (not shown) between the inner circumferential surface 221a and the outer circumferential surface 221b.

According to an embodiment of the disclosure, the second device 220 may perform a rotation motion 201 about the C1-axis passing through the center of the great circle 211b with respect to the inner circumferential surface 221a. According to one embodiment of the disclosure, the second device 220 may perform a tilting motion 202. When the second device 220 performs the tilting motion 202, a region of the spherical surface 211a, which faces the inner circumferential surface 221a may be changed, and accordingly, the great circle 211b, the first small circle 211c, and the second small circle 211d, and the C1-axis may also be different. According to an embodiment of the disclosure, the tilting motion 202 may also be referred to as a rotation motion about the Xc-axis orthogonal to the C1-axis of the rotational motion 201.

According to one embodiment of the disclosure, the driving device of the first device 210 may include a second driving device (not shown) for generating a motion (e.g., the rotational motion 201 or the tilting motion 202) of the second device 220. According to one embodiment of the disclosure, a force that attracts each other (attractive force) or a force that repels each other (repulsive force) may act between the second driving device and the second device 220 with the first housing 211 interposed therebetween. For example, the second device 220 may include a plurality of second magnets disposed on the inner circumferential surface 221a, and the second driving device may include a plurality of first magnets aligned with the plurality of second magnets. The second device 220 may be positioned on the first housing 211 by a magnetic force, such as the attractive force or repulsive force acting between the first magnets and the second magnets. For example, a state where the second device 220 is magnetically levitated from the surface of the first housing 211 of the first device 210 may be maintained by a magnetic force, such as the attractive or repulsive force acting between the first magnets and the second magnets. When the second driving device performs a rotation motion or a tilting motion, the second device 220 may also perform a rotation motion 201 or a tilting motion 202 due to due to the attractive or repulsive force between the plurality of first magnets and the plurality of second magnets.

In the second device 220 according to various embodiments of the disclosure, second ball casters may be disposed adjacent to the second magnets. This may assist to maintain the state where the second device 220 is spaced apart and levitated from the surface of the spherical housing 211 of the first device 210 by a predetermined distance, and may reduce, when the first device 210 rolls, the frictional force generated between the first device 210 and the second device 220.

According to various embodiments of the disclosure, the second device 220 is not limited to the form illustrated herein and may be formed in various other forms movable on the first housing 211.

According to one embodiment of the disclosure, the first device 210 may control the second driving device, based on a program (e.g., the program 140 of FIG. 1) or instructions stored in a memory (e.g., the memory 130 of FIG. 1) included in the first device 210 or the second device 220. For example, the first device 210 may control the second driving device, based on a signal (or input) received from an external electronic device (e.g., the external electronic device 102 or 104 or the server 108 of FIG. 1) or data obtained from at least one second sensor (e.g., sensor related to acceleration, gyro, or geomagnetism) disposed in at least one of the first device 210 or the second device 220, and accordingly, the rotation direction, rotation angle, rotation amount, rotation speed, rotation acceleration, or rotation angular velocity related to the rotation motion 201 or the tilting motion 202 of the second device 220 may be determined.

According to one embodiment of the disclosure, the first device 210 may receive a signal from the second device 220 or transmit a signal to the second device 220 through wireless communication. For example, the first device 210 may communicate with the second device 220 through a short-range communication network (e.g., the first network 198 of FIG. 1), such as Bluetooth, WiFi direct, or infrared data association (IrDA). According to various embodiments of the disclosure, the first device 210 or the second device 220 may wirelessly communicate with an external control unit (e.g., data logging or navigation system).

According to various embodiments of the disclosure, the electronic device 200 may be implemented as an autonomous robot or a remotely controlled (teleoperated) robot.

Figure 3:
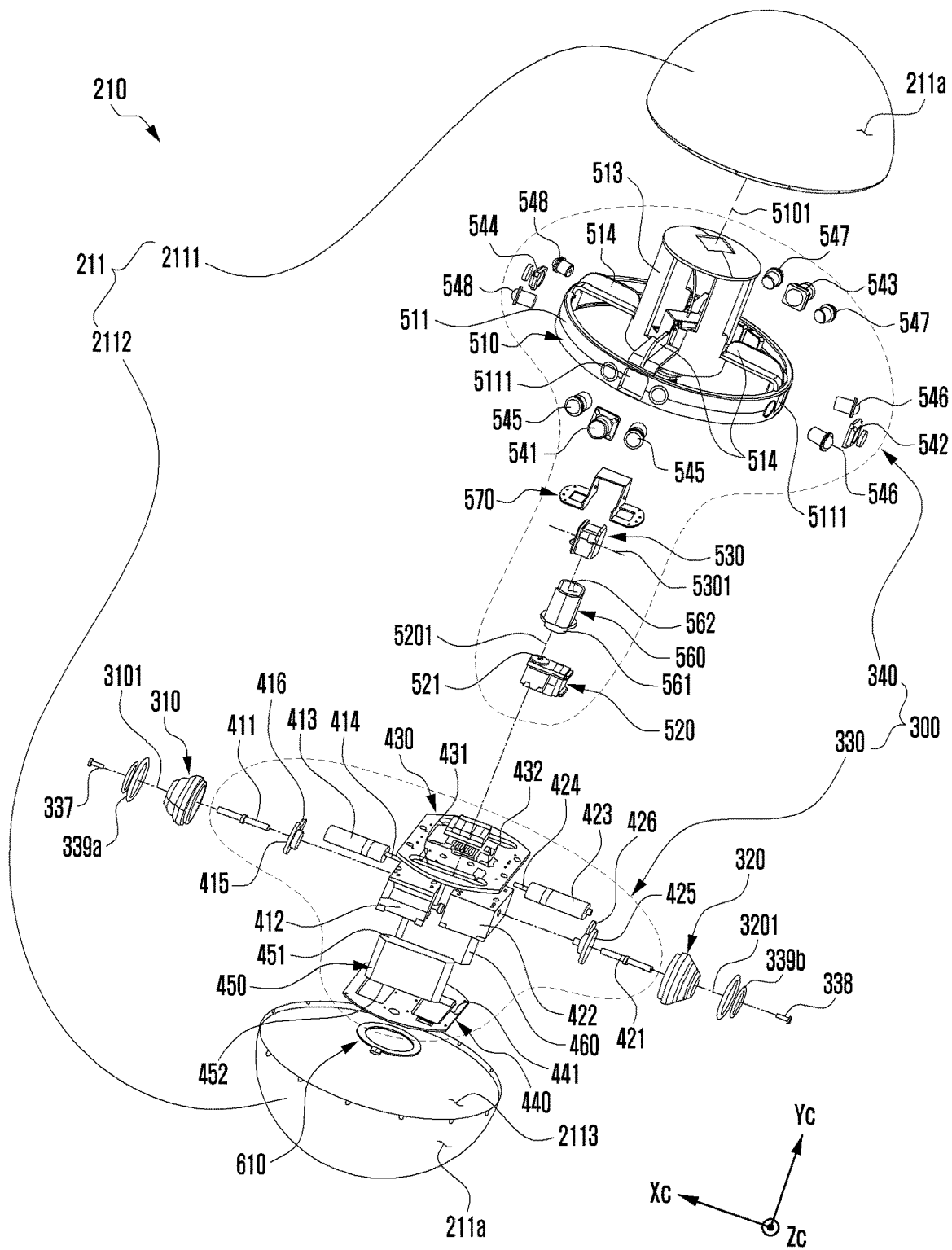
FIG. 3 is an exploded perspective view of a first device according to an embodiment of the disclosure.

FIG. 3 is an exploded perspective view of a first device of FIG. 2 according to an embodiment of the disclosure.

Figure 4:
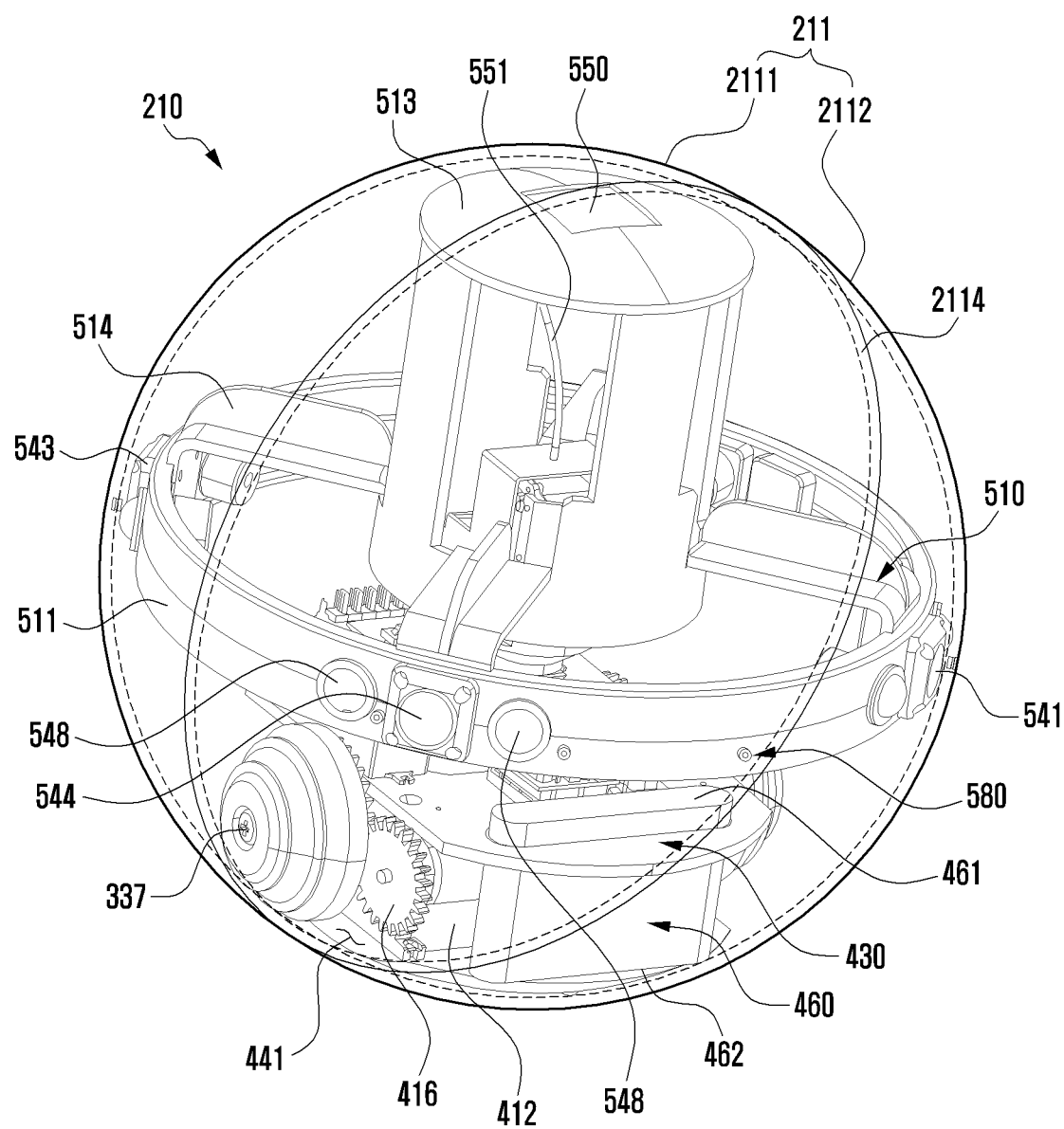
FIG. 4 is a perspective view illustrating an internal structure of the first device according to an embodiment of the disclosure.

FIG. 4 is a perspective view illustrating an internal structure of a first device of FIG. 2 according to an embodiment of the disclosure.

Referring to FIGS. 3 and 4, in one embodiment of the disclosure, the first device 210 may include at least one of a first housing 211, a first wheel 310, a second wheel 320, or a driving device 300 (e.g., a first driving device 330 and a second driving device 340).

According to one embodiment of the disclosure, the first housing 211 may include a first hemispherical housing 2111 and a second hemispherical housing 2112. The first wheel 310, the second wheel 320, and the driving device 300 may be disposed in a spherical inner space formed by a combination of the first hemispherical housing 2111 and the second hemispherical housing 2112. In FIG. 4, the first housing 211 is transparently expressed for structural understanding of the elements disposed inside the first housing 211, but according to various embodiments of the disclosure, the first housing 211 may be formed of an opaque or transparent material. According to various embodiments of the disclosure, at least a portion of the first housing 211 may be formed of a solid material or a flexible material (or an elastic material). For example, the first housing 211 may include an external structure forming an elastic outer spherical surface 211a and an inner structure forming a rigid inner side surface 2113.

According to various embodiments of the disclosure, the first housing 211 may fully seal the first device 210 from the external environment. For example, a sealing material may be interposed in a joint portion 2114 between the first hemispherical housing 2111 and the second hemispherical housing 2112.

According to one embodiment of the disclosure, the driving device 300 may include a first driving device 330 for transmitting power to the first wheel 310 and the second wheel 320. The first wheel 310 and the second wheel 320 may be coupled to the opposite sides of the first driving device 330 to receive power from the first driving device 330 and thus may rotate. According to an embodiment of the disclosure, the first driving device 330 may be referred to as an element including a wheel (e.g., the first wheel 310 and the second wheel 320).

According to one embodiment of the disclosure, the first drive device 330 may include elements for transmitting power to the first wheel 310, and may include, for example, at least one of a first shaft 411, a first support member 412, a first motor 413, a first gear 415, or a second gear 416. The first shaft 411 may connect the first wheel 310 and the first support member 412 to each other. One end of the first shaft 411 may be coupled to the first wheel 310 by a bolt 337, and the other end of the first shaft 331 may be rotatably coupled to a hole (not shown) formed through the first support member 412. The first gear 415 may be disposed between the first wheel 310 and the first support member 412 and connected to the first shaft 411. The first motor 413 may be disposed on the first support member 412, and the shaft 414 of the first motor 413 may be connected to the second gear 416. The first gear 415 and the second gear 416 may transmit rotation or power between the first shaft 411 and the shaft 414 of the first motor 413. For example, the first gear 415 and the second gear 416 may be a spur gear or a helical gear. When the first motor 413 is driven, the first wheel 310 may rotate by the interaction between the second gear 416 connected to the shaft 414 of the first motor 413 and the first gear 415 connected to the first shaft 411. According to one embodiment of the disclosure, the first gear 415 may have a greater number of teeth than the second gear 416, and the first gear 415 and the second gear 416 may be provided at various gear ratios. According to various embodiments of the disclosure, various other gears (e.g., bevel gear, screw gear) that transmit power between the first wheel 310 and the first motor 413 may be replaced, and accordingly, the arrangement of the first shaft 411 and/or the first motor 413 may be changed. According to an embodiment of the disclosure, the first wheel 310 and the shaft 414 of the first motor 413 may be directly connected to each other without the first gear 415 and the second gear 416.

According to one embodiment of the disclosure, the first driving device 330 may include elements for transmitting power to the second wheel 320, and the elements may be provided in substantially the same manner as the elements for transmitting power to the first wheel 310. For example, the first driving device 330, in relation to the second wheel 320, may include at least one of a second shaft 421, a second support member 422, a second motor 423, and a third gear 425, or a fourth gear 426. One end of the second shaft 421 may be coupled to the second wheel 320 by a bolt 338, and the other end of the second shaft 421 may be rotatably coupled to a hole (not shown) formed through the second support member 422. The third gear 425 may be disposed between the second wheel 320 and the second support member 422 and connected to the second shaft 421. The second motor 423 may be disposed on the second support member 422, and the shaft 424 of the second motor 423 may be connected to the fourth gear 426. The third gear 425 and the fourth gear 426 may transmit power between the second motor 423 and the second wheel 320. According to an embodiment of the disclosure, a rotational axis (axis of rotation) 3201 of the second wheel 320 and a rotational axis (axis of rotation) 3101 of the first wheel 310 may coincide with each other.

According to various embodiments of the disclosure, the first support member 412 and the second support member 422 may be integrally formed with each other and may include the same material.

According to various embodiments of the disclosure, the first wheel 310 and the second wheel 320 may include elastic members (or flexible members) 339a and 339b, such as a rubber, disposed on the surfaces thereof. The elastic members 339a and 339b may increase the frictional force with regard to the inner side surface 2113 of the first housing 211 and may reduce the loss of power transmitted to the first housing 211 from the first wheel 310 and the second wheel 320. According to one embodiment of the disclosure, the first wheel 310 and the second wheel 320 may have a truncated cone shape to increase a contact area between the inner side surface 2113 of the first housing 211 and the first wheel 310 and the second wheel 320. As a sufficient contact area between the inner side surface 2113 of the first housing 211 and the first wheel 310 and the second wheel 320 is secured, a sufficient frictional force for power transmission may be secured, and power transmission efficiency from the first wheel 310 and the second wheel 320 to the first housing 211 may be increased.

According to one embodiment of the disclosure, the first driving device 330 may include a printed circuit board 430 and a first plate 440 disposed in parallel in the first direction (Yc) orthogonal to the rotation axis 3101 (or the rotational axis 3201 of the second wheel 320) of the first wheel 310. According to various embodiments of the disclosure, a plate for supporting the printed circuit board 430 may be further provided.

According to one embodiment of the disclosure, the first support member 412 and the second support member 422 may be disposed between the printed circuit board 430 and the first plate 440. According to one embodiment (not shown) of the disclosure, the first support member 412 and the second support member 422 may be coupled to the printed circuit board 430 and/or the first plate 440 by using elements, such as a bolt.

According to one embodiment of the disclosure, the first driving device 330 may include a second plate 450 and a third plate 460 disposed in parallel in the third direction (Zc) orthogonal to the first direction (Yc) and the rotational axis 3101 (or the rotational axis 3201 of the second wheel 320) of the first wheel 310. The first support member 412 and the second support member 422 may be disposed between the second plate 450 and the third plate 460. One end 451 of the second plate 450 may be coupled to the printed circuit board 430, and the other end 452 of the second plate 450 may be coupled to the first plate 440. One end 461 of the third plate 460 may be coupled to the printed circuit board 430, and the other end 462 of the third plate 460 may be coupled to the first plate 440.

According to one embodiment of the disclosure, the printed circuit board 430 may include a first penetration portion 431 and a second penetration portion 432. One end 451 of the second plate 450 may be inserted into the first penetration portion 431, and one end 461 of the third plate 460 may be inserted into the second penetration portion 432. According to one embodiment of the disclosure, the first plate 440 may include one surface 441 facing the first direction (Yc), and the other end 452 of the second plate 450 and/or the other end 462 of the third plate 460 may be coupled to the one surface 441 by using an element, such as a bolt, so as to face the one surface 441.

According to an embodiment of the disclosure, the first plate 440 and the second plate 450 (or the third plate 460) may be integrally formed with each other and may include the same material.

According to one embodiment of the disclosure, at least a portion of the first plate 440, the second plate 450, the third plate 460, the first support member 412, or the second support member 422 may be formed of a metallic material or a non-metallic material.

According to one embodiment of the disclosure, the printed circuit board 430 may be equipped with a processor (e.g., the processor 120 of FIG. 1), a memory, and/or an interface. The processor may include, for example, one or more of a central processing unit, an application processor, a graphic processing unit, an image signal processor, a sensor hub processor, or a communication processor.

The memory (e.g., the memory 130 of FIG. 1) may include, for example, a volatile memory (e.g., the volatile memory 132 of FIG. 1) or a non-volatile memory (e.g., the non-volatile memory 134 of FIG. 1).

The interface (e.g., the interface 177 of FIG. 1) may include, for example, a high definition multimedia interface (HDMI), a universal serial bus (USB) interface, an SD card interface, and/or an audio interface. The interface may, for example, electrically or physically connect the electronic device 200 to an external electronic device, and may include a USB connector, an SD card/multimedia card (MMC) connector, or an audio connector.

According to one embodiment of the disclosure, at least one motor driving circuit (e.g., motor driver or motor controller) (not shown) may be disposed on the printed circuit board 430. The at least one motor driving circuit may be electrically connected to the first motor 413 and the second motor 423, and may output a corresponding signal to the first motor 413 or the second motor 413 according to the control of the processor (e.g., the processor 120 of FIG. 1). According to one embodiment of the disclosure, the processor may control the first motor 413 or the second motor 423, based on a program (e.g., the program 140 of FIG. 1) or instructions stored in a memory (e.g., the memory 130 of FIG. 1) included in the first device 210 or the second device (e.g., the second device 220 of FIG. 2). For example, the processor may control the first motor 413 or the second motor 423, based on a signal (or input) received from an external electronic device (e.g., the external electronic device 102 or 104 or the server 108 of FIG. 1) or data obtained from at least one second sensor (e.g., sensor related to acceleration, gyro, or geomagnetism) disposed in at least one of the first device 210 or the second device 220 (e.g., the second device 220 of FIG. 2), and accordingly, the rotation direction, rotation angle, rotation amount, rotation speed, rotation acceleration, or rotation angular velocity related to the rotation of the first wheel 310 or the second wheel 320 may be adjusted.

According to one embodiment of the disclosure, the first driving device 330 may include a battery (not shown) as a device for supplying power to at least one component of the first device 210. The battery may include, for example, a rechargeable secondary battery or a fuel cell. According to one embodiment of the disclosure, the battery may be disposed between the printed circuit board 430 and the first plate 440. According to various embodiments of the disclosure, the battery may be disposed in various different locations. According to various embodiments of the disclosure, the battery may also be implemented by solar cells.

According to one embodiment of the disclosure, the driving device 300 may include a second driving device 340 connected to the first driving device 330. The second driving device 340 may include, for example, a ring structure 510, a third motor 520, a fourth motor 530, a first support structure 560, a second support structure 570, a plurality of first magnets 541, 542, 543, and 544, or at least one of one or more second sensors 580.

According to one embodiment of the disclosure, the ring structure 510 may include a bracket 513, a ring-shaped plate (hereinafter, a ring plate) 511 surrounding the bracket 513, and a plurality of ribs 514 between the bracket 513 and the plates 511. The bracket 513 may be a shaft for receiving power. The ring plate 511 may be disposed to face the inner side surface 2113 of the first housing 211, and may be connected to the bracket 513 and the plurality of ribs 514 to perform a rotation motion or a tilting motion by the movement of the bracket 513. For example, the ring structure 510 may rotate about a third rotational axis 5101 passing the bracket 513. The center of gravity of the ring structure 510 may be formed on the third rotational axis 5101. According to one embodiment of the disclosure, the bracket 513 may include an opening, and may include a first edge (not shown) and a second edge (not shown) formed at different heights in the first direction (Yc).

According to one embodiment of the disclosure, the ring plate 511 may be disposed along a great circle (e.g., a circumference formed by the intersection of the spherical surface 211a and a plane passing through the center of the sphere) 211b of the first housing 211.

According to one embodiment of the disclosure, the third motor 520 may be disposed between the printed circuit board 530 and the bracket 513 of the ring structure 510. For example, the third motor 520 may be mounted on the printed circuit board 530. According to various embodiments (not shown) of the disclosure, various structures for coupling the third motor 520 and the printed circuit board 530 may be provided.

According to one embodiment of the disclosure, the fourth motor 530 may be disposed between the third motor 520 and the bracket 513 of the ring structure 510. According to one embodiment of the disclosure, the first support structure 560 may be disposed between the third motor 520 and the fourth motor 530 to connect the third motor 520 and the fourth motor 530. For example, the first support structure 560 may include one end 561 connected to the shaft 521 (or a gear connected to a shaft) of the third motor 520, and space 562 for fitting the fourth motor 530 thereinto. When the third motor 520 (e.g., pan motor) is driven, the first support structure 560 connected to the shaft 521 and the fourth motor 530 disposed on the first support structure 560 may rotate about the first rotational axis 5201 directed toward the first direction (Yc).

According to one embodiment of the disclosure, the second support structure 570 may connect the fourth motor 530 and the bracket 513 of the ring structure 510 to each other. When the third motor 520 is driven, the first support structure 560 connected to the shaft 521 of the third motor 520, the fourth motor 520 combined with the first support structure 560, the second support structure 570 connected to the fourth motor 520, and the ring structure 510 connected to the second support structure 570 may rotate about the first rotational axis 5201. When the fourth motor 530 (e.g., tilt motor) is driven, the second support structure 570 connected to a shaft (not shown) of the fourth motor 530 and the ring structure 510 connected to the second support structure 570 may perform a rotation motion (e.g., tilting motion) about a second rotational axis 5301 directed toward a direction orthogonal to the first direction (Yc).

According to one embodiment of the disclosure, when the first rotation shaft 5201 and the third rotational axis 5101 coincide with each other, the ring structure 510 may be referred to as being in a horizontal state with respect to the first driving device 330. When the third motor 530 is driven when the first rotational axis 5201 and the third rotation axis 5101 coincide with each other, the ring structure 510 may rotate, in a horizontal state, about the first rotational axis 5201 or the third rotational axis 5101. When the third motor 520 is driven when the first rotational axis 5201 and the third rotational axis 5101 do not coincide with each other by the driving of the fourth motor 530, the ring structure 510 may rotate, in a non-horizontal state, about the rotational axis 5201.

According to one embodiment of the disclosure, at least one motor driving circuit (e.g., motor driver or motor controller) disposed on the printed circuit board 430 may be electrically connected to the third motor 520 and the fourth motor 530. At least one motor driving circuit may output a corresponding signal to the third motor 520 and the fourth motor 530 under the control of the processor (e.g., the processor 120 of FIG. 1). According to one embodiment of the disclosure, the processor may control the third motor 520 or the fourth motor 530, based on a program (e.g., the program 140 of FIG. 1) or instructions stored in a memory (e.g., the memory 130 of FIG. 1) included in the first device 210 or the second device (e.g., the second device 220 of FIG. 2). For example, the processor may control the third motor 520 or the fourth motor 530 of the second driving device 340, based on a signal (or input) received from an external electronic device (e.g., the external electronic device 102 or 104 or the server 108 of FIG. 1 or the second device 220 of FIG. 2) or data obtained from at least one second sensor (e.g., sensor related to acceleration, gyro, or geomagnetism) disposed in at least one of the first device 210 or the second device (e.g., the second device 220 of FIG. 2).

According to one embodiment of the disclosure, the one or more second sensors 580 may be disposed on the ring plate 511 of the ring structure 510. According to one embodiment of the disclosure, the one or more second sensors 580 may be disposed on one surface of the ring plate 511 facing the inner side surface 2113 of the first housing 211. According to various embodiments of the disclosure, the one or more second sensors 580 may be disposed in a recess formed on the ring plate 511. The one or more second sensors 580 may be disposed on the ring plate 511 at regular intervals along the circumference thereof.

According to one embodiment of the disclosure, the one or more second sensors 580 may measure a posture value of the ring structure 510. According to one embodiment of the disclosure, the posture value may include a value for at least one of a roll, a pitch, and a yaw of the ring structure 510. For example, the ring structure 510 may move with respect to the first driving device 330 by the driving of the third motor 520 and/or the fourth motor 530, and the one or more second sensors 580 may measure the posture value for the movements. According to one embodiment of the disclosure, the one or more second sensors 580, which are related to acceleration, gyro, or geomagnetism, may include, for example, a 9-axis sensor.

According to one embodiment of the disclosure, the one or more second sensors 580 may include an acceleration sensor capable of measuring the change in force of gravitational acceleration acting on the x-axis, the y-axis, and the z-axis (e.g., axis extending in the first direction (Yc)). The acceleration sensor may measure an inclination with respect to gravitational acceleration. For example, when the third rotational axis 5101 of the ring structure 510 coincides with the first rotational axis 5201, a value of gravitational acceleration acting on the x-axis and the y-axis is 0, and when the value of gravitational acceleration acting on the z-axis is 1G, the ring structure 510 (or the ring plate 511) may be in a horizontal posture. For example, when the ring structure 510 rotates about the y-axis, the force of gravitational acceleration acting on the x-axis and the z-axis may change and the ring structure 510 may be in a non-horizontal state. For example, when the ring structure 510 rotates around the x-axis, the force of the gravitational acceleration acting on the y-axis and the z-axis may change and the ring structure 510 may be in a non-horizontal state.

According to one embodiment of the disclosure, the one or more second sensors 580 may include gyro sensor capable of measuring angular velocity (the amount of change in angle per unit time) of the ring structure 510 with respect to the x-axis, the y-axis, and the z-axis (e.g., axis extending in the first direction (Yc)).

According to one embodiment of the disclosure, the one or more second sensors 580 may include a geomagnetic sensor capable of detecting a direction or rotation of the ring structure 510 by using the Earth's magnetic field.

According to one embodiment of the disclosure, the plurality of first magnets 541, 542, 543, and 544 may be disposed on the ring plate 511 of the ring structure 510. For example, the plurality of first magnets 541, 542, 543, and 544 may be disposed in the plurality of recesses 5111 (or through holes) formed on the ring plate 511. The plurality of first magnets 541, 542, 543, and 544 may provide a force that repels (repulsive force) or a force that attracts (attractive force) a second device (e.g., the second device 220 of FIG. 2) coupled to the first device 210. For example, the second device may include a plurality of second magnets aligned with the plurality of first magnets 541, 542, 543, and 544, and accordingly an attractive force or a repulsive force may act between the ring plate 511 and the second device with the first housing 211 interposed therebetween. When the second driving device 340 rotates by the third motor 520 or tilts by the fourth motor 530, the second device may also rotate (e.g., the rotational motion 201 of FIG. 2) or tilt (e.g., the tilting motion 202 of FIG. 2) due to the attractive or repulsive force between the plurality of first magnets 541, 542, 543, and 544 and a plurality of the second magnets.

According to one embodiment of the disclosure, the plurality of first magnets 541, 542, 543, and 544 may be disposed on the ring plate 511 at regular intervals along the circumference thereof. According to one embodiment of the disclosure, the one or more second sensors 580 may be disposed between the plurality of first magnets 541, 542, 543, and 544.

According to one embodiment of the disclosure, a plurality of first ball casters 545, 546, 547, and 548 may be disposed adjacent to the positions of the plurality of first magnets 541, 542, 543, and 544. According to one embodiment of the disclosure, the first ball casters may allow the ring structure 510 to be spaced apart from the inner side surface of the first housing 211 at a predetermined distance and may serve to reduce the frictional force between the ring structure 510 and the first housing 211 during the rolling process of the electronic device 200.

According to one embodiment of the disclosure, a posture value of the ring structure 510, measured by the one or more second sensors 580 may be referred to as a posture value of the second device (e.g., the second device of FIG. 2) moving together with the ring structure 510. According to various embodiments of the disclosure, the position or number of the one or more second sensors 580 is not limited to the example illustrated in FIG. 3, 4, or 5 and may be formed in differently.

According to one embodiment of the disclosure, the first device 210 may include at least one antenna. The at least one antenna may transmit a signal or power to the outside (e.g., the external electronic device 102 or 104 of FIG. 1) or receive the same from the outside. According to one embodiment of the disclosure, the first device 210 may transmit or receive a signal or power to or from a second device (e.g., the second device 220 of FIG. 2) coupled to the first device 210 via the at least one antenna. According to one embodiment of the disclosure, the at least one antenna may be formed as a conductor or a conductive pattern. According to one embodiment of the disclosure, the at least one antenna may be utilized in a short-range wireless communication network (e.g., the first network 198 of FIG. 1) or a long-range wireless communication network (e.g., the second network 199 of FIG. 1).

According to one embodiment of the disclosure, the first device 210 may include a balance weight. The balance weight may bias the center of gravity of the first device 210 in the second direction (−Yc) opposite to the first direction (Yc). For example, the center of gravity of the first device 210 may be formed at a position spaced apart from a rotational axis 3101 or 3201 of a wheel in the second direction (−Yc). According to one embodiment of the disclosure, the balance weight may balance the first device 210 such that the rear surface (e.g., surface facing the inner side surface 2113 of the first housing 211) of the first plate 440 is substantially directed toward the second direction (−Yc). According to one embodiment of the disclosure, the balance weight may be formed by at least a portion of the first support member 412, the second support member 422, the first plate 440, the second plate 450, the third plate 460, or a battery included in the first driving device 330. According to various embodiments of the disclosure, the second driving device 340 may be formed to have a weight less than or equal to a preconfigured weight, compared to the first driving device 330, and thus the center of gravity of the first driving device 210 may be biased in the second direction (−Yc). According to various embodiments of the disclosure, the second driving device 340 may be formed to have a height less than or equal to a preconfigured height, and thus the center of gravity of the first device 210 may be biased in the second direction (−Yc). According to various embodiments of the disclosure, even when the first device 210 and the second device (e.g., the second device 220 of FIG. 2) are combined with each other, the balance weight may balance the first device 210 such that the back surface of the first plate 440 is substantially directed toward the direction (−Yc).

According to one embodiment of the disclosure, the balance weight may resolve an imbalance of the first driving device 330, which may be caused when the first driving device 330 transmits power to the first wheel 310 and/or the second wheel 320. For example, the wheel (e.g., the first wheel 310 or the second wheel 320) may contact the first housing 211 and rotate accordingly (action), and the driving device 300 may receive an influence (for example, rotating shaft vibration) from the torque that rotates power transmission elements (e.g., the first shaft wheel 411, the second shaft 421, the first gear 415, the second gear 416, the third gear 425, and the fourth gear 426) connected to the wheel (reaction). The balance weight may weaken or offset the torque applied to the driving device 300 by the reaction.

According to one embodiment of the disclosure, the balance weight may resolve an imbalance of the first driving device 330 which may be caused when the second driving device 340 performs a rotational motion or a tilting motion.

According to one embodiment of the disclosure, the first device 210 may include an antenna 610 disposed on the rear surface (e.g., surface facing the second direction (−Yc)) of the first plate 440 of the first driving device 330 or between the rear surface of the first plate 440 and the first housing 211. According to an embodiment of the disclosure, the antenna 610 may also be disposed inside the first plate 440. The antenna 610 may wirelessly transmit/receive power required for charging, for example, as a wireless charging antenna. According to one embodiment of the disclosure, the balance of the first driving device 330 in the first housing 211 may be held by the balance weight, and the surface on which the antenna 610 is disposed may be directed toward the second direction (−Yc).

According to one embodiment of the disclosure, the first device 210 may be configured to move to a wireless charging device (not shown) when the remaining battery level reaches a preconfigured value, based on a program (e.g., the program 140 of FIG. 1) or instructions stored in a memory (e.g., the memory 130 of FIG. 1). For example, when the first device 210 is moved to the wireless charging device, the antenna 610 may be aligned with an antenna included in the wireless charging device and power may be transmitted wirelessly to the first device 210 from the wireless charging device by electromagnetic induction between the two antennas.

According to one embodiment of the disclosure, the rear surface of the first plate 440 (e.g., surface facing the second direction (−Yc)) may include a curved surface along the inner side surface 2113 of the first housing 211. According to one embodiment of the disclosure, when the first driving device 330 is balanced by the balance weight, the rear surface of the first plate 440 may be spaced apart from the inner side surface 2113 of the first housing 211 by the first wheel 310 and the second wheel 320 which are in contact with the inner surface 2113 of the first housing 211.

Figure 5A:
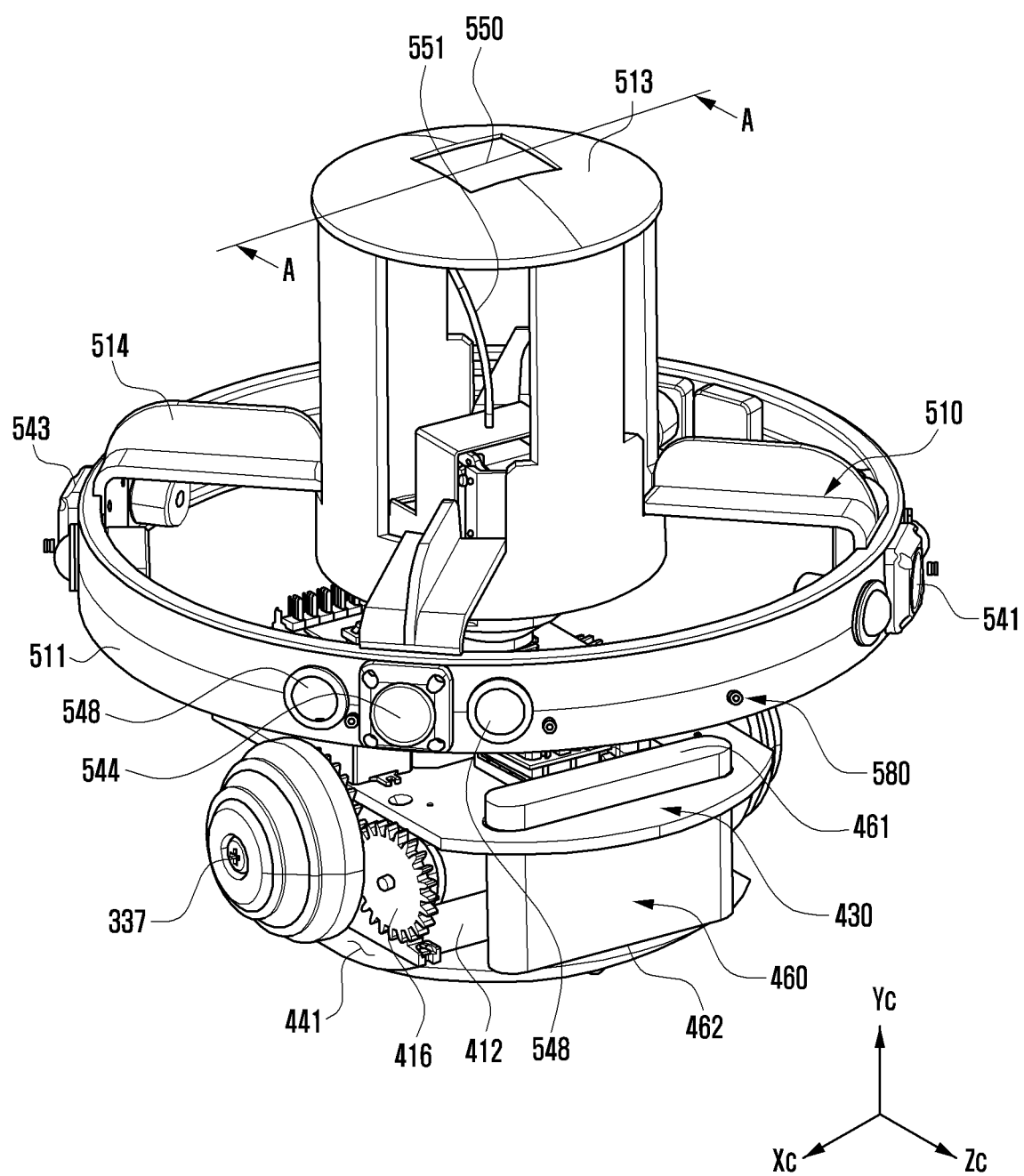
FIG. 5A illustrates a first device of FIG. 4, from which a first housing is omitted, according to an embodiment of the disclosure.

FIG. 5A illustrates first device of FIG. 4, from which a first housing is omitted, according to an embodiment of the disclosure.

Figure 5B:
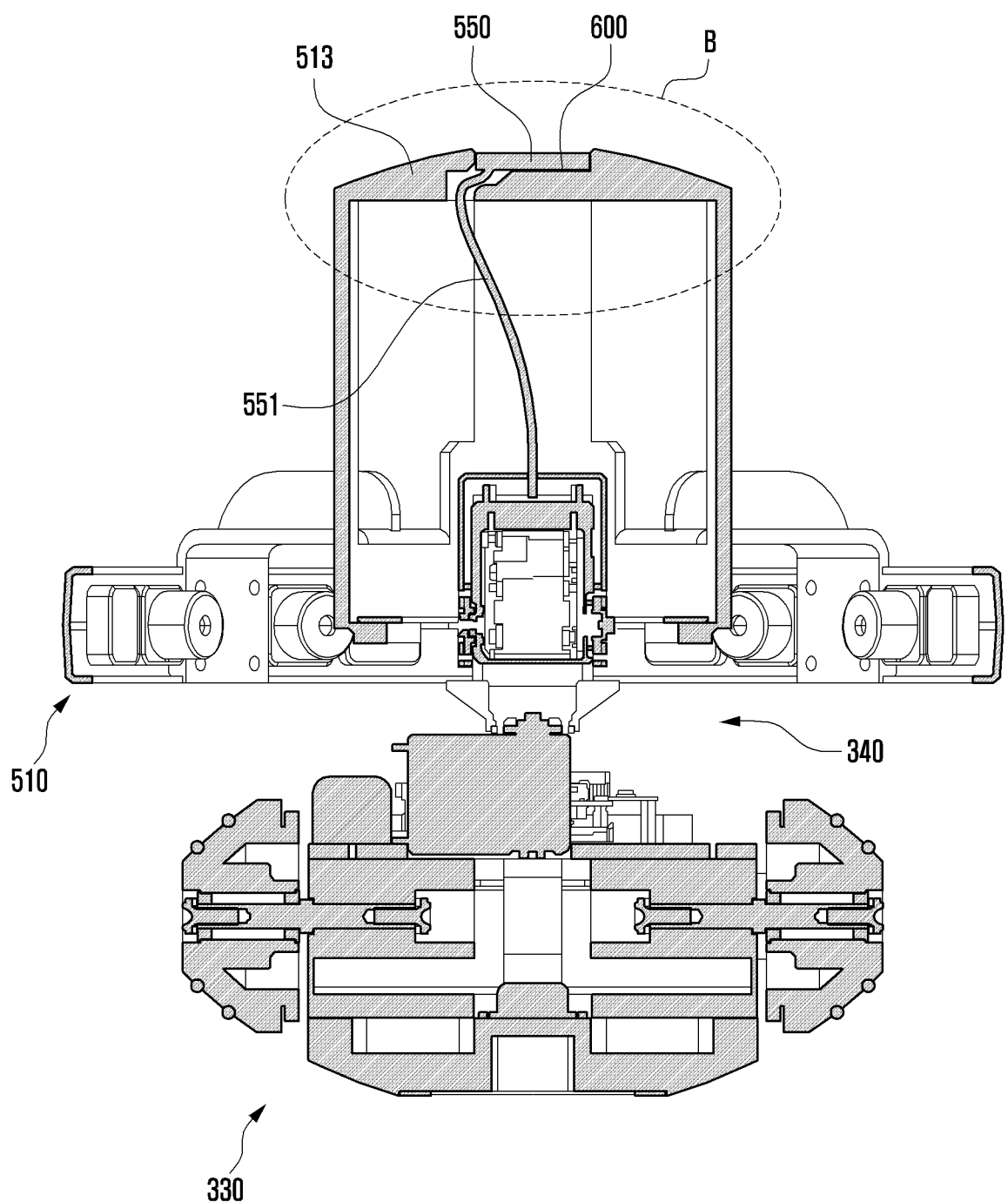
FIG. 5B is a sectional view taken along A-A line of FIG. 5A according to an embodiment of the disclosure.

FIG. 5B is a sectional view taken along line A-A of FIG. 5A according to an embodiment of the disclosure.

Figure 5C:
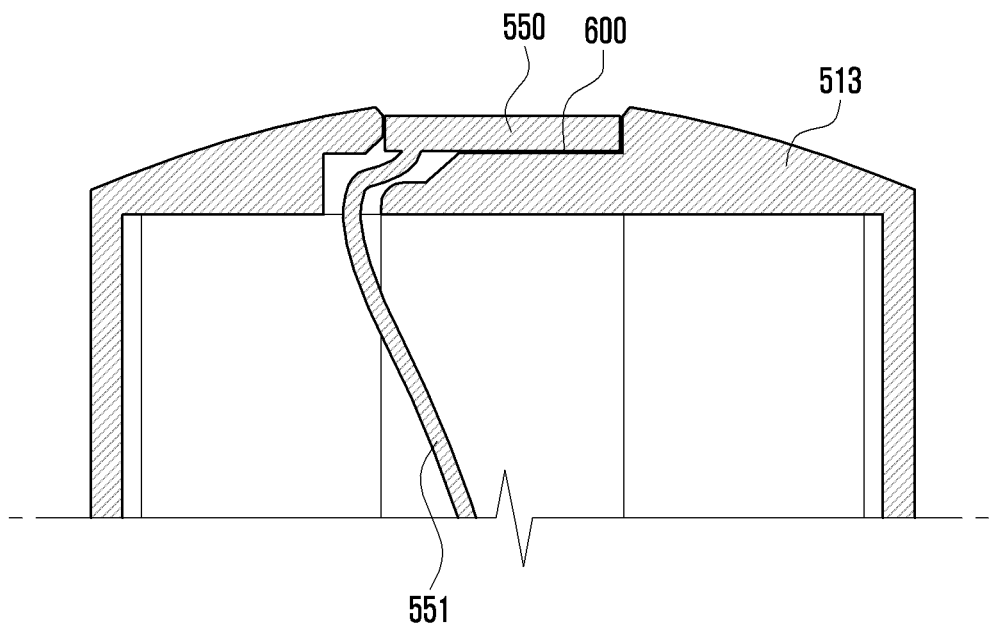
FIG. 5C is an enlarged view of part B of FIG. 5B according to an embodiment of the disclosure.

FIG. 5C is an enlarged view of part B of FIG. 5B according to an embodiment of the disclosure.

Referring to FIGS. 5A, 5B, and 5C, in one embodiment of the disclosure, the first device 210 may include a first sensor 550, a bracket 513, or a cable 551.

According to one embodiment of the disclosure, the first sensor 550 may be a touch sensor. Hereinafter, the first sensor 550 may be referred to as a "touch sensor". The touch sensor 550, which is a pointing device, may be electrically connected to a touch sensor integrated circuit (IC). The cable 551 may electrically connect the touch sensor 550 and the printed circuit board on which the touch sensor IC is disposed to each other. The cable 551 may be replaced with various other flexible electrical connection members, such as a flexible printed circuit (FPCB). The touch sensor 550 may include a touch detection circuit including a conductive pattern. The touch sensor 550 may also be referred to as a touch detection circuit.

According to one embodiment of the disclosure, the touch sensor 550 and the touch sensor IC may be implemented based on a capacitive method. The touch sensor IC (e.g., touch controller integrated circuit (IC)) may apply a voltage to the touch sensor 550, and the touch sensor 550 may form an electromagnetic field. For example, when a finger is adhered to a partial region of the first housing 211 (see FIG. 2) facing the touch sensor 550 or reaches within a threshold distance, the change in capacitance based on the change in the electromagnetic field may be equal to or greater than the threshold value. When the change in capacitance becomes equal to or greater than the threshold value, the touch sensor IC may generate an electrical signal regarding coordinates, as a valid user input, and transmit the same to the processor (e.g., the processor 120 of FIG. 1). The processor may recognize the coordinates, based on the electrical signal received from the touch sensor IC. The touch sensor 550 and the touch sensor IC may be collectively referred to as a sensor circuit for detection a touch. The touch sensor IC may convert an analog signal obtained via the touch sensor 550 into a digital signal. According to various embodiments of the disclosure, the touch sensor IC may perform various functions, such as noise filtering, noise removal, or detection data extraction, in relation to the touch sensor 550. According to various embodiments of the disclosure, the touch sensor IC may include various circuits, such as an analog-digital converter (ADC), a digital signal processor (DSP), and/or a micro control unit (MCU). According to various embodiments of the disclosure, a partial region of the first housing 211 facing the touch sensor 550 may be referred to as a "touch input region". According to one embodiment of the disclosure, the first housing 211 facing the touch sensor 550 may be made of a dielectric material or a non-metal material to reduce an effect on the electromagnetic field generated from the touch sensor 550. For example, when the first housing 211 includes a metal material, detection performance with regard to the touch sensor 550 may be deteriorated. According to one embodiment of the disclosure, the first housing 211 may be formed of a dielectric or a non-metal material, so that detection performance with regard to the touch sensor 550 may be secured.

According to one embodiment of the disclosure, the electronic device 200 may detect a user input generated when a user directly touches the first device 210, via the touch sensor 550. The processor (e.g., the processor 120 of FIG. 1) may perform various functions or operations, based on a user input detected via the touch sensor 550. A user input via the touch sensor 550 may be achieved by a touch input, a hovering input, or a gesture input. The touch input may refer to, for example, a user input that may be generated by contact between a finger and a partial region of the first housing 211 facing the touch sensor 550. The hovering input may refer to, for example, a user input that may be generated without contact between a finger and a partial region of the first housing 211 facing the touch sensor 550. The gesture input may refer to, for example, a user input related to a finger movement (or a finger movement pattern).

For example, various gesture inputs may be possible via a partial region of the first housing 211 facing the touch sensor 550 by using a finger, and various functions or actions of the electronic device 200 may be implemented based on the gesture input. According to one embodiment of the disclosure, the gesture input via the touch sensor 550 may include a user input detected when a single tap is performed on a partial region of the first housing 211 facing the touch sensor 550. The gesture input via the touch sensor 550 may include a user input detected when a double tap is performed on a partial region of the first housing 211 facing the touch sensor 550. The gesture input via the touch sensor 550 may include a user input detected when swiping is performed on a partial region of the first housing 211 facing the touch sensor 550. The gesture input via the touch sensor 550 may include a user input performed based on various other gestures. The user input in the movable electronic device 200 via the touch sensor 550 and the electronic device 200 operating in response thereto may implement an interactive or an interaction type environment between the electronic device 200 and a user.

According to one embodiment of the disclosure, the touch sensor 550 may be located inside the first housing 211. For example, when the touch sensor 550 is disposed in the first housing 211, the touch sensor 550 may be placed in a location where it is difficult for a user to touch due to the rolling motion of the first housing 211. According to one embodiment of the disclosure, the touch sensor 550 may be disposed on the bracket 513 connected to the ring structure 510. For example, the bracket 513 may include one surface 600 facing the inner side surface of the first housing 211, and the touch sensor 550 may be disposed on the one surface 600. The electronic device 200 maintains a posture of the ring structure 510 with respect to the first housing 211 so that the touch sensor 550 may be retained at a position where a user easily touches the same. For example, referring to FIG. 4, the posture of the ring structure 510 with respect to the first housing 211 is maintained, and one surface 600 (see FIG. 5B and FIG. 5C) of the bracket 513 on which the touch sensor 550 is disposed may be directed toward a preconfigured or designated direction. According to one embodiment of the disclosure, the posture of the ring structure 510 with respect to the first housing 211 is maintained, and the one surface 600 may be directed toward a direction forming a preconfigured or designated angle with the direction of gravity. For example, the one surface 600 may be directed toward a direction substantially opposite to the direction of gravity. For example, even when the first housing 211 is rotating or when the rotation thereof is stopped, one surface 600 of the bracket 513 on which the touch sensor 550 is disposed may be directed toward a direction substantially opposite to the direction of gravity.

According to one embodiment of the disclosure, the processor (e.g., the processor 120 of FIG. 1) may measure the posture value of the ring structure 510 via the second sensors 580. The memory (e.g., the memory 130 of FIG. 1) may store a reference posture value and a posture control instruction for controlling a posture of the ring structure 510 (or the second device 220 of FIG. 2 which moves together with the ring structure 510), based on the reference posture value. The reference posture value, which is a posture-related value configured with respect to the ring structure 510, may include, for example, a value for at least one of roll, pitch, and yaw. According to one embodiment of the disclosure, the posture control instruction may include a routine related to posture compensation for maintaining the ring structure 510 (or the second device 220) in a posture corresponding to the reference posture value in a movement section (e.g., state in which a motor is driven) or a non-movement section (e.g., state in which a motor is not driven) of the first driving device 330 (see FIG. 3). For example, when an application that tracks a user is executed, the reference posture value may vary according to a motion output related to an operation for controlling the posture of the second device 220 (or the ring structure 510) in order to track a user via the camera. For example, the reference posture value may vary according to a motion output related to a user interaction (e.g., system in which a response is made by a user input). The processor may control the second driving device 340 (see FIG. 3) according to the posture control instruction stored in the memory.

According to one embodiment of the disclosure, the posture control instruction may include a routine for allowing the processor (e.g., the processor 120 of FIG. 1) to obtain a posture value (e.g., value for at least one of roll, pitch, and yaw) regarding the ring structure 510 (or the second device 220 of FIG. 2) from at least one sensor (e.g., the second sensors 580). According to an embodiment of the disclosure, the posture control instruction may also include a routine for allowing the processor to obtain the posture value from the second device 220. For example, the second device 220 may include at least one sensor related to acceleration, gyro, or geomagnetism, and may also transmit the posture value obtained from the at least one sensor to the first device 210 via a wireless communication circuit.

According to one embodiment of the disclosure, the posture control instruction may include a routine for allowing the processor (e.g., the processor 120 of FIG. 1) to calculate a compensation value for posture compensation from a posture value obtained from at least one sensor (e.g., the second sensors 580) and a reference posture value stored in the memory (e.g., the memory 130 of FIG. 1). For example, the processor may compare the posture value obtained from the at least one sensor and the reference posture value stored in the memory to calculate a posture error therebetween and may output a value for compensating the posture error to allow the ring structure 510 (or the second device 220 of FIG. 2) to be in a posture corresponds to the reference posture value. The posture control instruction may include a routine for allowing the processor to control the second driving device 340 (see FIG. 3) related to the movement of the ring structure 510 (or the second device 220 of FIG. 2), based on the compensation value. For example, the processor may output based on the compensation value to a motor controller connected to at least one motor (e.g., the third motor 520 or the fourth motor 530 in FIG. 3) related to the ring structure 510. The motor controller may control at least one motor, based on a signal received from the processor, and the rotation direction, rotation angle, rotation amount, rotation speed, rotation acceleration, or rotation angular velocity of the at least one motor is adjusted, thereby compensating the postures of the ring structure 510 and the second device 220 of FIG. 2 moving together with the ring structure 510. According to an embodiment of the disclosure, the posture control instruction may include a routine for allowing the processor, when a posture value obtained from the at least one sensor differs from a reference posture value stored in the memory by a threshold value or more, to control the motor controller of the second driving device 340, based on the difference.

According to various embodiments of the disclosure, the posture control instruction may include a routine for allowing the processor (e.g., the processor 120 of FIG. 1), when a compensation value is calculated based on the posture value obtained from the at least one sensor (e.g., the second sensors 580), to collect, store, or analyze data having the same as respective fields. When a posture value is output from at least one sensor, the processor may derive a corresponding compensation value by using the accumulated data as a resource without calculating a compensation value based on the output posture value. This may reduce the time for deriving a compensation value or increase the accuracy thereof.

According to various embodiments of the disclosure, the posture control instruction may also include a routine for allowing the processor (e.g., the processor 120 of FIG. 1) to control the motor controller of the second driving device 340 (see FIG. 3) for posture compensation of the ring structure 510 (or the second device 220 of FIG. 2), based on a driving state (e.g., rotation direction, rotation angle, rotation amount, rotation speed, rotation acceleration, or rotation angular velocity) of at least one motor of the first driving device 330 (see FIG. 3). When the first driving device 330 is driven, a driving state (e.g., rotation direction, rotation angle, rotation amount, rotation speed, rotation acceleration, or rotation angular velocity) of at least one wheel may be used as data for calculating or estimating posture compensation of the ring structure 510 (or the second device 220). According to one embodiment of the disclosure, the first driving device 330 may include a motor encoder for detecting a driving state of at least one motor. For example, the motor encoder may include a disk coupled to a rotational shaft of a motor, and a detector configured to detect rotation direction, rotation angle, rotation amount, rotation speed, rotation acceleration, or rotation angular velocity of the rotational shaft by using electronically recognizable scales and marked on the disk.

According to various embodiments of the disclosure, the posture control instruction may also include a routine for allowing the processor (e.g., the processor 120 of FIG. 1) to control the motor controller of the second driving device 340 (see FIG. 3) for posture compensation of the ring structure 510 or the second device 220, based on image data obtained from a camera positioned in the second device 220 of FIG. 2.

According to one embodiment of the disclosure, when the posture of the ring structure 510 is controlled, the touch sensor 550 disposed on the bracket 513 connected to the ring structure 510 is retained at a position where a user easily touches the same. For example, referring to FIG. 4, the touch sensor 550 may be positioned in a direction substantially opposite to the direction of gravity. A partial region of the first housing 211 facing the touch sensor 550, which is a touch input region, may be retained at a position thereof regardless of the rolling motion of the first housing 211. For example, referring to FIG. 5A, the touch sensor 550 may be disposed adjacent to face a portion of the inner side surface of the first housing 211 directed toward the first direction (Yc) (e.g., the direction opposite to the direction of gravity). For example, referring to FIG. 4, when the posture of the ring structure 510 with respect to the first housing 211 is maintained, one surface 600 (see FIGS. 5B and 5C) of the bracket 513 on which the touch sensor 550 is disposed may be directed toward a preconfigured or designated direction, based on the driving device 300 (e.g., the second driving device 340) (see FIG. 3). According to one embodiment of the disclosure, when the posture of the ring structure 510 with respect to the first housing 211 is maintained, the one surface 600 may be directed toward a direction forming a preconfigured or designated angle with the direction of gravity. For example, the one surface 600 may be directed toward a direction substantially opposite to the direction of gravity, based on the second driving device 340. According to various embodiments of the disclosure, the one surface 600 may be implemented to be directed toward various other directions, based on the second driving device 340. According to various embodiments of the disclosure, when the position of a touch input region of the first housing 211 formed to face the touch sensor 550 is maintained, an interactive or an interaction type environment between a user and the electronic device 200 implemented as a robot may be improved. For example, when a user performs a gesture, such as swiping, on a touch input region substantially located in the upper region of the first housing 211 by using a finger, the electronic device 200 may detect the gesture via the touch sensor 550 and may perform an interactive operation reacting thereto.

According to one embodiment of the disclosure, the plurality of ribs 514 may connect the bracket 513 to the ring structure 510, and the bracket 513 may be connected to the ring structure 510 through the plurality of ribs 514. The bracket 513 may extend from the plurality of ribs 514 to the inner side surface of the first housing 211. According to various embodiments of the disclosure, the ring structure 510 may also be defined by the bracket 513 and/or the plurality of ribs 514 included therein.

According to one embodiment of the disclosure, the electronic device 200 may activate or drive the first driving device 330 (see FIG. 3), the second driving device 340 (see FIG. 3), or various elements, such as at least one sensor, based on a user input detected via the touch sensor 550.

For example, when a user input (e.g., user input via a tap gesture) is detected via the touch sensor 550 in the standby mode, the electronic device 200 may change the mode from the standby mode to an active mode to activate or drive the first driving device 330, the second driving device 340, or various elements, such as at least one sensor.

For example, when a user input via a double tap gesture is detected via the touch sensor 550, the electronic device 200 may perform a tilting motion (e.g., see reference numeral 202 in FIG. 2) of the second device 220 with respect to the first housing 211.

For example, when a user input based on a swiping gesture is detected via the touch sensor 550, the electronic device 200 may recognize the user input as a charging command and perform a function (e.g., function of moving to a power supply or a charging device to perform charging).

According to various embodiments of the disclosure, various user inputs may be input via the touch sensor 550, and various other functions based on the inputs (e.g., interactive function as a robot with a user) may be implemented.

According to various embodiments of the disclosure, a function or operation performed based on various user inputs via the touch sensor 550 may be performed based on a program (e.g., the program 140 of FIG. 1) or instructions stored in a memory (e.g., the memory 130 of FIG. 1) included in the first device 210 or the second device 220.

According to an embodiment of the disclosure, the first sensor 550 may be a microphone. When the posture of the ring structure 510 is controlled, the microphone disposed on the bracket 513 connected to the ring structure 510 may be retained at a position at which a user voice is easily received. According to various embodiments of the disclosure, the first sensor 550 may include various other elements capable of receiving a user input.

According to an embodiment of the disclosure, the electronic device (e.g., the electronic device 200 of FIG. 2) may include a first device (e.g., the first device 210 of FIG. 2) including a spherical housing (e.g., the first housing 211 of FIG. 2) which is rotatable and has an inner space formed therein. The electronic device may include a ring-shaped second device (e.g., the second device 220 of FIG. 2) disposed on an outer surface (e.g., the first surface 211a of FIG. 2) of the spherical housing. The first device may include a first driving device (e.g., the first driving device 330 of FIG. 3) disposed inside the spherical housing and capable of transmitting power to the spherical housing. The first device may include a structure (e.g., the ring structure 510, the plurality of ribs 514, and the bracket 513 of FIG. 3) disposed inside the spherical housing and allowing the second device to be disposed on a surface of the spherical housing. The first device may include a second driving device (e.g., the second driving device 340 of FIG. 3) disposed inside the spherical housing and driving the structure. The first device may include at least one first sensor (e.g., the first sensor 550 of FIG. 4, 5A, 5B, or 5C) disposed on the structure and facing the inner side surface of the spherical housing.

According to one embodiment of the disclosure, the at least one first sensor (e.g., the first sensor 550 of FIG. 4, 5A, 5B, or 5C) may include a touch sensor.

According to an embodiment of the disclosure, one surface (e.g., one surface 600 of FIG. 5B or 5C) of the structure on which the at least one first sensor (e.g., the first sensor 550 of FIG. 4, 5A, 5B, or 5C) is disposed may be directed toward a direction preconfigured or designated based on the second driving device (e.g., the second driving device 340 of FIG. 3).

According to an embodiment of the disclosure, the preconfigured or designated direction may be a direction opposite to the direction of gravity.

According to an embodiment of the disclosure, the electronic device may further include at least one second sensor (e.g., the second sensors 580 of FIG. 4) disposed in the structure (e.g., the ring structure 510 of FIG. 3), and a processor (e.g., the processor 120 of FIG. 1) electrically connected to the first driving device (e.g., the first driving device 330 in FIG. 3), the second driving device (e.g., the second driving device 340 in FIG. 3), and the at least one first sensor (e.g., the first sensor 550 of FIG. 4, 5A, 5B, or 5C). The processor may obtain a value related to at least one of acceleration, gyro, and geomagnetism from the at least one second sensor and may control the second driving device based on the obtained value.

According to one embodiment of the disclosure, the value obtained from the at least one second sensor (e.g., the second sensors 580 of FIG. 4) may include a value related to at least one of roll, pitch, or yaw.

According to an embodiment of the disclosure, the processor (e.g., the processor 120 of FIG. 1) may control the second driving device (e.g., the second driving device 340 of FIG. 3), based on the difference between a reference value and the obtained value.

According to one embodiment of the disclosure, the structure may include a ring structure (e.g., the ring structure 510 of FIG. 3) disposed to face the inner side surface of the spherical housing (e.g., the first housing 211 in FIG. 3), and a bracket (e.g., the bracket 513 of FIG. 3, 4, 5a, 5b, or 5c) including one surface (e.g., one surface 600 of FIG. 5B or 5C) extending from the ring structure and facing the inner side surface of the spherical housing. The at least one first sensor (e.g., the first sensor 550 of FIG. 4, 5A, 5B, or 5C) may be disposed on the one surface (e.g., one surface 600 of FIG. 5B or 5C) of the bracket.

According to one embodiment of the disclosure, the first driving device (e.g., the first driving device 330 of FIG. 3) may include at least one wheel (e.g., the first wheel 310 and the second wheel 320 of FIG. 3), and a motor (e.g., the first motor 413 and the second motor 423 of FIG. 3) connected to the at least one wheel.

According to one embodiment of the disclosure, the second driving device (e.g., the second driving device 340 of FIG. 3) may include at least one motor (e.g., the third motor 520 of FIG. 3) disposed between the ring structure (e.g., the ring structure 510 of FIG. 3) and the first driving device (e.g., the first driving device 330 of FIG. 3) and connected to the ring structure.

According to one embodiment of the disclosure, the ring structure (e.g., the ring structure 510 of FIG. 3) may include a ring-shaped surface facing the inner side surface of the spherical housing (e.g., the first housing 211 of FIG. 3). The electronic device may further include a plurality of ball casters (e.g., the plurality of first ball casters 545, 546, 547, 548 of FIG. 3) at least partially positioned on the ring-shaped surface to be in contact with the inner side surface of the spherical housing.

According to one embodiment of the disclosure, the at least one first sensor (e.g., the first sensor 550 of FIG. 4) may include a microphone.

According to one embodiment of the disclosure, the first driving device (e.g., the first driving device 330 of FIG. 3) may include a balance weight.

According to one embodiment of the disclosure, the electronic device may further include a processor (e.g., the processor 120 of FIG. 1) electrically connected to the first driving device (e.g., the first driving device 330 of FIG. 3), the second driving device (e.g., the second driving device 340 of FIG. 3), and the at least one first sensor (e.g., the first sensor 550 of FIG. 4). The processor may control at least one of the first driving device and the second driving device, based on a user input detected via the at least one first sensor.

According to one embodiment of the disclosure, the electronic device may further include at least one first magnet (e.g., the plurality of first magnets 541, 542, 543, and 544 of FIG. 3) disposed in the structure (e.g., the ring structure 510 of FIG. 3), and at least one second magnet disposed in the second device (e.g., the second device 220 of FIG. 2). The structure and the second device can move together by an attractive or repulsive force between the first magnet and the second magnet.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
   a first device comprising
      a spherical housing including an inner spherical surface and an outer spherical surface;
      a first driving device disposed inside the spherical housing and configured to provide power to the spherical housing such that the spherical housing is rotated with respect to the first driving device,
      a second driving device connected to the first driving device, and including a structure disposed inside the spherical housing and at least one motor configured to rotate or tilt the structure with respect to the first driving device,
      at least one first magnet disposed on the structure, and
      at least one first sensor disposed on the structure and facing the inner spherical surface of the spherical housing; and
   a second device having a ring shape and surrounding the spherical housing to move around the outer spherical surface of the spherical housing,
   when the second device comprises at least one second magnet disposed at positions to cause an attractive or repulsive force with respect to the at least one first magnet such that the second device rotates with respect to the first device, and
   wherein when the second device rotates with respect to the first device, the structure of the first device moves together with the second device.
2. The electronic device of claim 1, wherein the at least one first sensor comprises a touch sensor.

3. The electronic device of claim 1, wherein one surface of the structure on which the at least one first sensor is disposed is directed toward a direction designated based on the second driving device.

4. The electronic device of claim 3, wherein the designated direction is a direction opposite to a direction of gravity.

5. The electronic device of claim 3, further comprising:
at least one second sensor disposed in the structure; and
a processor electrically connected to the first driving device, the second driving device, the at least one first sensor, and the least one second sensor,
wherein the processor is configured to:
obtain a value related to at least one of acceleration, gyro, or geomagnetism from the at least one second sensor, and
control the second driving device, based on the obtained value.

6. The electronic device of claim 5, wherein the value obtained from the at least one second sensor comprises a value related to at least one of roll, pitch, or yaw.

7. The electronic device of claim 5, wherein the processor is further configured to control the second driving device, based on a difference between a reference value and the obtained value.

8. The electronic device of claim 1, wherein the structure comprises:
a ring plate, wherein the at least one first magnet is disposed on a surface of the ring plate facing the inner spherical surface of the spherical housing; and
a bracket extending from the ring plate and connected to the at least one motor, wherein the at least one first sensor is disposed on a surface of the bracket facing the inner spherical surface of the spherical housing.

9. The electronic device of claim 8,
wherein the first device further comprises a plurality of ball casters disposed on the surface of the ring plate facing the inner spherical surface of the spherical housing, and being in contact with the inner spherical surface of the spherical housing.

10. The electronic device of claim 1,
wherein the first driving device further comprises:
at least one wheel in contact with the inner spherical surface of the spherical housing, and
a motor connected to the at least one wheel, and
wherein a power from the motor is transmitted to the spherical housing via the at least one wheel.

11. The electronic device of claim 1, wherein the at least one first sensor comprises a microphone.

12. The electronic device of claim 1, wherein the first driving device further comprises a balance weight.

13. The electronic device of claim 1, further comprising:
a processor electrically connected to the first driving device, the second driving device, and the at least one first sensor,
wherein the processor is configured to control at least one of the first driving device or the second driving device, based on a user input detected via the at least one first sensor.

* * * * *